United States Patent [19]
Bernard et al.

[11] Patent Number: 5,327,215
[45] Date of Patent: Jul. 5, 1994

[54] SENSOR HAVING OPTICAL PASSIVE RING RESONATOR USING SAGNAC EFFECT

[75] Inventors: Walter Bernard, Daisendorf; Götz Geister, Salem, both of Fed. Rep. of Germany

[73] Assignee: Bodenseewerk Gerätetechnik GmbH, Bodensee, Fed. Rep. of Germany

[21] Appl. No.: 961,249

[22] Filed: Oct. 16, 1992

[30] Foreign Application Priority Data

Oct. 24, 1991 [DE] Fed. Rep. of Germany ....... 4135132

[51] Int. Cl.$^5$ ............................................ G01C 19/72
[52] U.S. Cl. .................................................. 356/350
[58] Field of Search ..................... 356/350; 385/12, 14

[56] References Cited

U.S. PATENT DOCUMENTS

| | | | |
|---|---|---|---|
| 4,653,917 | 3/1987 | Moeller et al. ...................... | 356/350 |
| 4,661,964 | 4/1987 | Haavisto ............................. | 356/350 |
| 5,004,342 | 4/1991 | Bernard et al. ..................... | 356/350 |
| 5,237,387 | 8/1993 | Sanders .............................. | 356/350 |

FOREIGN PATENT DOCUMENTS

| | | |
|---|---|---|
| 0290723B1 | 11/1988 | European Pat. Off. . |
| 0393968A3 | 10/1990 | European Pat. Off. ............ 356/350 |
| 0393987A3 | 10/1990 | European Pat. Off. ............ 356/350 |
| 3501975A1 | 9/1985 | Fed. Rep. of Germany ....... 356/350 |
| 3805904A1 | 8/1989 | Fed. Rep. of Germany . |
| 3805905A1 | 8/1989 | Fed. Rep. of Germany . |
| 3912005A1 | 10/1990 | Fed. Rep. of Germany . |
| 3919060A1 | 12/1990 | Fed. Rep. of Germany . |

OTHER PUBLICATIONS

"Optische Kreiselsensoren", by Von W. Holzapfel, VDI-Berichte Nr. 509, 1984, pp. 119–124.
"Closed-Loop Low-Noise Fiber-Optic Rotation Sensor" by J. L. Davis and S. Ezekiel, 1982 Optical Society of America, pp. 186–188.

*Primary Examiner*—Samuel A. Turner
*Attorney, Agent, or Firm*—Lowe, Price, LeBlanc & Becker

[57] ABSTRACT

A sensor which makes use of a non-reciprocal optical effect, such as the Sagnac effect has a passive ring resonator defining a closed light path. Light from a broadband light source is coupled to the passive ring resonator by 2×2 couplers in a first direction of propagation and a second direction of propagation opposite thereto. The 2×2 couplers also couple light out of the passive ring resonator. A 3×3 optical coupler is provided, by which light having circulated in said ring resonator in the first direction of propagation is superimposed to light having circulated in the ring resonator in the second direction of propagation to provide interference. The detector is exposed to this interfering light.

11 Claims, 4 Drawing Sheets

SENSOR HAVING OPTICAL PASSIVE RING RESONATOR USING SAGNAC EFFECT

BACKGROUND OF THE INVENTION

The present invention relates to a new and improved construction of a sensor which makes use of a non-reciprocal optical effect.

In its more specific aspects, the present invention particularly relates to a new and improved construction of a sensor which makes use of a non-reciprocal optical effect and which comprises a passive ring resonator defining a closed light path, light source means, coupler means for coupling light from said light source means into said passive ring resonator with a first direction of propagation and a second direction of propagation opposite thereto and for coupling light out of said passive ring resonator, and detector means exposed to light coupled out by said coupler means.

An example of a non-reciprocal, optical effect is the Sagnac effect. A light path is defined by mirrors or light conductors which surrounds an area. In the state of rest, the optical path lengths of this light path for the light travelling clockwise and the light travelling counter-clockwise are identical. If, however this assembly makes a rotary movement, the optical path lengths for the light travelling clockwise and the light travelling counter-clockwise becomes different. The difference of the optical path lengths is proportional to the angular rate and to the area surrounded by the optical path. Angular rate sensors can be designed making use of this Sagnac effect.

Various types of sensors based on the Sagnac effect are known.

Glass fiber rate sensors comprise a glass fiber which is wound to form a coil of many turns around an area. The glass fiber has two ends. Light from a laser is directed by means of a beam splitter to both one end and the other end of the glass fiber. The light beam directed onto one end travels through the coil with a first direction of propagation, for example clockwise. The light directed onto the other end of the glass fiber travels through the coil with a second direction of propagation, thus, for example, counter-clockwise. The counter-clockwise light beam emerges at said one end. The clockwise light beam emerges at said other end. The two emerging light beams are superimposed and caused to produce interferences. The interfering light beams are directed onto a detector. The interference fringes are shifted, if the sensor is subjected to an angular rate. This is observed as detector output signal; see the publication by Holzapfel, entitled "Optische Kreiselsensoren", VDI-Bericht No. 509, 1984.

In order to achieve high sensitivity of such a glass fiber angular rate sensor, a long fiber in a coil having many turns is required. This, in turn, requires high quality fibers, in order to avoid inadmissibly strong attenuation. Such fibers are expensive.

German Published patent applications Ser. No. 3,805,904; 3,805,905; 3,912,005 and 3,919,060 show glass fiber angular rate sensors with six-port couplers.

Furthermore, sensors with ring lasers are known. A ring laser has a ring resonator. Such a ring resonator establishes a closed optical path, which may, for example, be defined by three plane mirrors. This optical path is established within a vessel, in which a gas discharge path is provided. The gas discharge path in the ring resonator acts as an optical amplifier. With sufficient gain of the gas discharge, the system will operate as a ring laser. A fraction of the generated laser beam is coupled out by means of a partially transparent mirror. With such ring lasers, it is known to cause interferences of the light beams coupled out. The interference pattern is detected ba two detectors located side by side. In the state of rest, the pattern of interference fringes is also at rest. When an angular rate is sensed, the optical path lengths of the ring resonator for the light beam travelling clockwise and the light beam travelling counter-clockwise will be changed in opposite sense. Thereby the ring laser operates at different frequencies clockwise and counterclockwise. The interference fringes start to move over the detectors. The two detectors permit determination of a direction. Signals at the beat frequency are generated by the detectors. This beat frequency is proportional to the angular rate. Summing-up of the pulses generated by the interference fringes provides the angle of rotation. Sensors of this type are also called "laser gyros".

Such "laser gyros" are expensive. Laser gyros have a marked response threshold due to frequency coupling ("lock-in"). This response threshold has to be exceeded by a dither movement (Holzapfel "Optische Kreiselsensoren", VDI-Bericht No. 509, 1984).

Sensors which are known, for example, from European Pat. No. 0,290,723, use passive ring resonators. Passive ring resonators, again, have a closed optical path. Light from a laser is coupled into this optical path through couplers, once clockwise and once counter-clockwise. In this case, the ring resonator is not part of a laser, as in a laser gyro, but is an independent optical resonator. A well-defined portion of the light travelling clockwise in the ring resonator is coupled out through a coupler or a partially transparent mirror and is directed onto a first photoelectric detector. Also a well-defined portion of the light travelling counterclockwise in the ring resonator is coupled out and is directed onto a second photoelectric detector. The signals of the two photoelectric detectors depend on where the frequency of the lase light is located with respect to the resonance frequencies of the ring resonator existing for the two directions of propagation. When the ring resonator is ted to an angular rate about an axis normal to the plane of the ring resonator, the two resonance frequencies are changed in opposite sense. The electrical signals from the detectors are used to generate, by signal processing, output signals which are indicative of the angular rate of the ring resonator about an axis normal to the plane of the ring resonator. Realizations of this basic concept are known from, for example, European Pat. No. 0,290,723 which is cognate with U.S. Pat. No. 5,004,342, granted Apr. 2, 1991.

The prior art angular rate sensors using passive ring resonators usually require optical insulation of the laser, serving as light source, from the ring resonator by an "optical diode". Otherwise, the frequency of the laser will be influenced by the ring resonator. Such optical insulation is very expensive. If no such insulation is provided, as in the sensor according to European Pat. No. 0,290,723, the frequency of the laser has to be controlled through the current with strong feedback. This adversely affects the sensitivity of the sensor.

SUMMARY OF THE INVENTION

Therefore, with the foregoing in mind, it is a primary object of the present invention to provide a new and improved construction of a sensor which is not afflicted with the drawbacks and limitations of the prior art constructions heretofore discussed.

It is an another and more specific object of the present invention to provide a new and improved sensor of the initially mentioned type and which sensor is of a simple design using a non-reciprocal optical effect.

It is further important object of the present invention to provide an inexpensive sensor using a non-reciprocal optical effect.

A still more specific object of the present invention is directed to providing a simple and inexpensive angular rate sensor making use of the Sagnac effect.

Now in order to implement these and still further objects of the invention, which will become more readily apparent as the description proceeds, the sensor of the present development is manifested by the features of, among other things, a passive ring resonator defining a closed light path, light source means, coupler means for coupling light from said light source means into said passive ring resonator with a first direction of propagation and a second direction of propagation opposite thereto and for coupling light out of said passive ring resonator, and detector means exposed to light coupled out by said said coupler means, wherein interferometer means are provided, by which light having circulated in said ring resonator in said first direction of propagation is superimposed to light having circulated in said ring resonator in said second direction of propagation to provide interference, and said detector arrangement comprises a detector exposed to said interfering light.

According to the invention, signal evaluation is carried out by means of an interferometer, similar to the glass fiber angular rate sensors. This interferometric signal evaluation, however, does not use a sensor operating with a finite, long glass fiber but with a ring resonator, i.e. a closed, relatively short optical path.

As compared to glass fiber angular rate sensors of the type mentioned, the invention offers the advantage that no long glass fiber of high optical quality is required. The length of the glass fiber which, in the prior art, results in increased sensitivity is replaced by the finesse of the ring resonator.

As compared to a laser gyro, the invention offers the advantage of considerably lower expenditure.

As compared to prior art sensors with passive ring resonators, the invention offers the advantage, that the sensitivity of the sensor is not adversely affected by optical feedback between ring resonator and laser.

In the inventive sensor, the light source means advantageously may comprise a broadband, incoherent source emitting a band of light, a resonance frequency of said passive ring resonator lying within said band emitted by said source. For example, said light source means may be a super luminescence diode or an edge light emitting diode (ELED).

According to one aspect of the invention, said passive ring resonator preferably is a closed light conductor. A first light conductor guiding a first light beam from said source extends substantially tangential to said passive ring resonator, said coupler means comprising a first coupler arranged to optically couple said first light conductor with said ring resonator, whereby light of said first light beam is coupled into said passive ring resonator to circulate therein in said first direction of propagation. A second light conductor guiding a second light beam coherent with said first light beam from said light source means extends substantially tangential to said ring resonator on the side thereof remote from said first light conductor, first coupler means comprising also a second coupler arranged to optically couple said second light conductor with said passive ring resonator, whereby light of said second light beam is coupled into said passive ring resonator to circulate therein in said second direction of propagation. Said first coupler is arranged to couple light from a light beam, which has been coupled into said passive ring resonator by said second coupler, out of said passive ring resonator and into said first light conductor as a first coupled-out light beam having a direction of propagation opposite to that of said second light beam. Said second coupler is arranged to couple light from a light beam, which has been coupled into said passive ring resonator by said first coupler, out of said passive ring resonator and into said second light conductor as a second coupled-out light beam having a direction of propagation opposite to that of said first light beam. Said coupled-out light beams are superimposed by said interferometer means to provide said interferences. To this end, said interferometer means comprise a third coupler arranged to couple said second light conductor and said first light conductor so as to couple light from said second coupled-out light beam out of said second light conductor and into said first light conductor, whereby light from said second coupled out light beam and said first light beam is superimposed in said first light conductor. Said interferometer means further comprise a fourth coupler for coupling light from said superimposed light beams out of said first light conductor and for directing said coupled-out, superimposed light to said detector means. A phase modulator is provided in said first light guide between said third coupler and said first coupler.

According to another aspect of the invention, a six-port coupler couples said first light conductor, said second light conductor and a third light conductor. Said source is operatively connected to said third light conductor, whereby a first light beam is coupled by said six-port coupler out of said third light conductor and into said first light conductor, and a second light beam is coupled by said six-port coupler out of said third light conductor and into said second light conductor, said second light conductor having a free end extending out of said six-port coupler and arranged to direct light to said detector means.

Said light conductors and said passive ring resonator can be made of light conducting fibers. Said light conductors and said passive ring resonator can, however, also be waveguides defined by integrated optics technology in a substrate.

BRIEF DESCRIPTION OF THE DRAWINGS

The invention will be better understood and objects other than those set forth above, will become apparent when consideration is given to the following detailed description thereof. Such description makes reference to the annexed drawings wherein the same or analogous components are designated by the same reference characters and wherein.

DETAILED DESCRIPTION OF THE PREFERRED EMBODIMENTS

Figure 1:
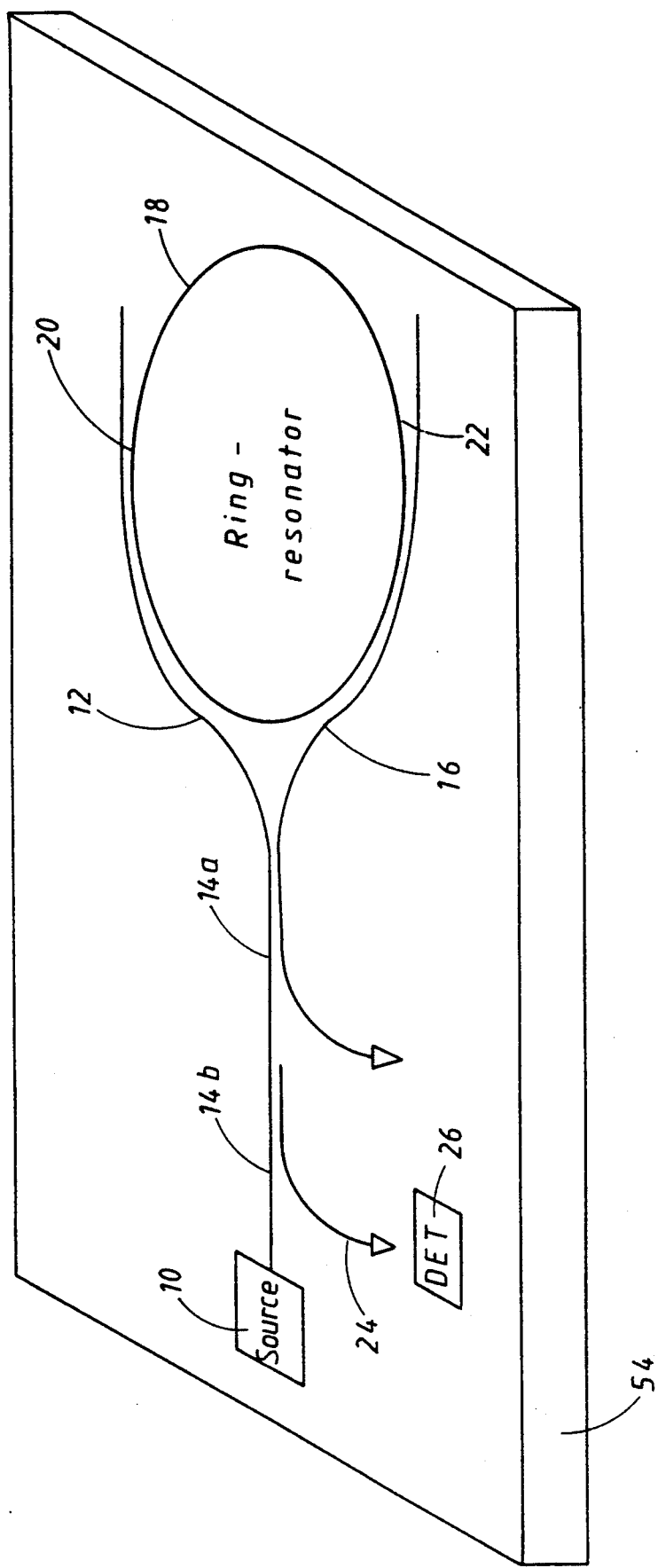
FIG. 1 is a schematic illustration of the basic principle of an exemplary embodiment of the inventive sensor.

Describing now the drawings, it is to be understood that only enough of the construction of the sensor has been shown as needed for those skilled in the art to readily understand the underlying principles and concepts of the present development, while simplifying the showing of the drawings. Turning attention now to FIG. 1, numeral 10 designates a light source. This light source 10 may be a laser. A light beam from this light source 10 is directed to a waveguide 12. Part of the light beam gets into a waveguide 16 through a coupler 14a. Numeral 18 designates a ring resonator. In the present case, this is a circular waveguide. The waveguide 12 extends from the coupler 14a tangentially to the ring resonator 18 on a first side of this ring resonator 18 (on the top in FIG. 1). The waveguide 12 and the ring resonator 18 are arranged to form a coupler 20 therebetween. Part of the light directed from the light source 10 into the waveguide 12 is coupled through coupler 20 clockwise into the ring resonator 18. Thus a light beam circulates in the ring resonator 18 in a first direction of propagation, i.e. clockwise in FIG. 1.

The waveguide 16 extends, in the direction of the light beam coupled-in from the light source, from the coupler 14a tangentially to the ring resonator 18 on the side of the ring resonator 18 remote from the waveguide 12. The waveguide 16 and the ring resonator 18 are arranged to form a coupler 22 therebetween. The coupler 22 is located substantially diametrically opposite the coupler 20. Both waveguides 12 and 16 extend from the coupler 14a from the left to the right in FIG. 1. The coupler couples part of the light beam travelling in the waveguide 16 counter-clockwise, as viewed in FIG. 1, into the ring resonator 18. Thus another light wave travels in the ring resonator in a second direction of propagation opposite to the first direction of propagation, i.e. counterclockwise in FIG. 1.

Part of the counter-clockwise travelling light beam, as viewed in FIG. 1, is coupled out of the ring resonator 18 through coupler 20 into the waveguide 12. This coupled-out light beam travels in the waveguide 12 in the direction towards the coupler 14a. Thus the coupled out light beam travels in the waveguide 12 in a direction opposite to that of the light beam which is going to be coupled into the ring resonator by coupler 20. Part of this coupled-out light beam in waveguide 12 is, again, coupled out in the coupler 14a. This twice coupled-out light is not used further and is directed to an "optical sump". A further light beam is coupled out of the waveguide 12 by a coupled 14b, which is arranged between the coupler 14a and the light source. This coupled-out portion of the "returning" light beam travels in the waveguide 24 beyond the coupler 14b to a photoelectric detector 26. Correspondingly, part of the light beam circulating clockwise in the ring resonator 18 is coupled out through the coupler 22 and is coupled into the waveguide 16. This coupled-out light beam travels in the waveguide 16 in the direction towards the couplers 14a and 14b and the detector, thus from the right to the left in FIG. 1.

In the end 24, the light beam coupled out by the couplers 20 and 14b, which corresponds to the light wave travelling counter-clockwise in FIG. 1 in the ring resonator 18, is superimposed to the light beam coupled out by couplers 22, 14a and 15b, which corresponds to the light wave travelling clockwise in FIG. 1 in the ring resonator. As both light beams have travelled nearly identical paths, they have the same phase and interfere with each other.

Therefore, a more or less strong addition of the light takes place depending on the optical path length difference. This optical path length difference is varied by non-reciprocal optical effects, which become effective on the ring resonator 18. Such a non-reciprocal optical effect is the Sagnac effect. The Sagnac effect generates an optical path difference between the clockwise and the counter-clockwise path of the ring resonator 18, when the ring resonator 18 makes a rotary movement about an axis normal to the plane of the ring resonator 18. It can be shown that, with the described arrangement with the ring resonator 18, the variation of the optical path length difference of the two light beams in the end 24 caused by such rotary movement is proportional to the angular rate and to the finesse F of the ring resonator 18.

The effect of the finesse F of the ring resonator 18 is similar to the effect of the number of turns N of a fiber coil of a glass fiber angular rate sensor. The phase difference caused by an angular rate $\Omega$ between the clockwise and the counter-clockwise light beams due to the Sagnac effect in a glass fiber angular rate sensor having an area A is $$\phi_s^{INT} = \frac{8\pi}{\lambda_o c_o} \cdot AN\Omega$$

With a ring resonator sensor of the type described, the phase difference caused by the Sagnac effect between interfering light beams is $$\phi_s^{RES} = \frac{8}{\lambda_o c_o} A \cdot F \cdot \Omega$$

Apart from the factor $\pi$, the finesse F has the same effect as the number of turns N. With regard to the phase difference and, thereby, to the sensitivity, a ring resonator having a finesse $F > 300$ is equivalent to a glass fiber angular rate sensor of identical surrounded area and $N = 100$ turns.

Quantitatively, the following is obtained:

The gradient of the signal shape near the working point $\rho_s = 0$ is a measure of the resolution of the sensor with respect to small, non-reciprocal phase shifts. For small, non-reciprocal phase shifts $\rho_s$ ($\rho_s << 2$), the detector signal $I(\rho_s)$ can be approximated with good accuracy by $$I(\rho_s) = \frac{4(\lambda - a)^2 \cdot (a\rho_s)}{((\lambda - a)^2 + (a\rho_s)^2)^2}$$

with $I_{max}(\rho_s) = 1$. The resonater parameter $$a = (1-\gamma)(1-R) e^{-\alpha L_R}$$

represents the intensity transmission of the resonator 18 for one passage of the light beam through the resonator 18. The gradient of $I(\rho_s)$ in any optional working point is determined by the finesse F of the ring resonator 18:

$$F = \pi \sqrt{\frac{\lambda + a^2}{2(\lambda - a)^2}}$$

Figure 2:
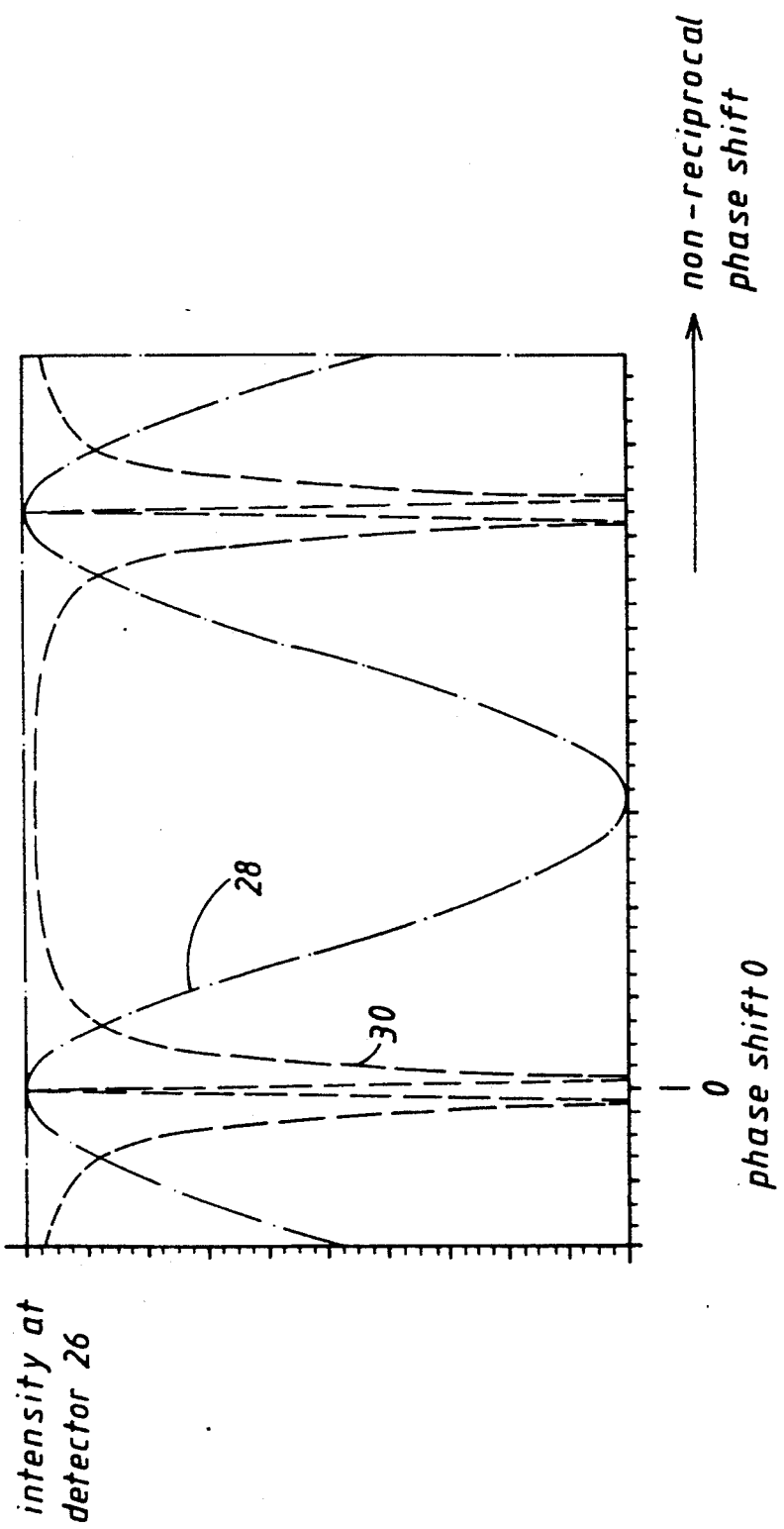
FIG. 2 is a diagram showing the intensity of the output signal as a function of the angular rate for two values of the finesse F of the ring resonator, namely F=1 and F=5, of the inventive sensor as shown in FIG. 1.

FIG. 2 illustrates the output intensity signal at detector 26 as a function of the angular rate about an axis normal to the plane of the ring resonator 18 for values of the finesse of F=1 and F=5. Numeral 28 designates the characteristic for F=1. Numeral 30 designates the characteristic for F=5. It will be noted that the characteristics become the steeper the higher the finesse of the ring resonator is. It will also be noted that the working point of the sensor should be placed in the range of the characteristic having maximum gradient.

There are various ways of achieving this goal.

Figure 3:
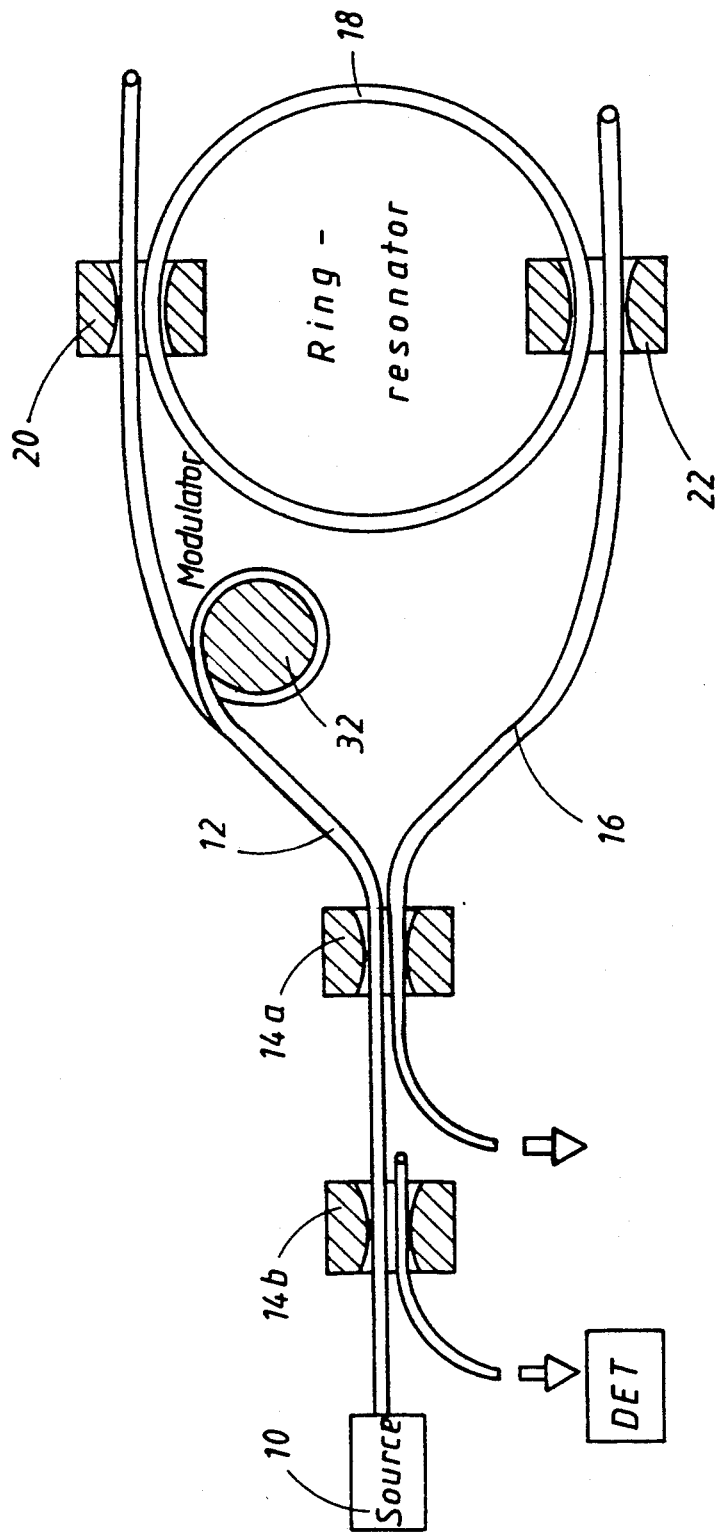
FIG. 3 is a modified embodiment of the inventive sensor as shown in FIG. 1 and in which sensor the working point can be shifted to a point of larger slope of the diagram of FIG. 2.

The embodiment of FIG. 3 is of similar design as the embodiment of FIG. 1. Corresponding elements are designated by the same reference numerals as in FIG. 1. In FIG. 3, a phase modulator 32 is provided in the waveguide 12.

The problem is to generate a well-defined additional non-reciprocal phase shift between the two light beams caused to interfere in the end 24 of the waveguide. This will place the working point (corresponding to an angular rate of zero) at a desired location of the characteristic. To this end, the phase shift imparted to the advancing light beam has to be different from the phase shift to which the returning light beam is subjected. The effect has to be "non-reciprocal". A constant phase shift in the wave guide 12 would not result in the desired displacement in the working point. Such a phase shift would have the same effect on both light beams. Such an effect would be reciprocal. The phase modulator is, however, operated at such a frequency that the phase shift for the advancing light beam and the returning light beam derived therefrom, which has travelled through the ring resonator 18 in a finite time interval, is different. The frequency of the phase modulator required to achieve this effect can be estimated. This can be done with considerations similar to those made for a fiber gyro in a paper by J.L. Davis and S. Ezekiel in "Opt. Lett." (6), pp 505 (1981). With a fiber ring resonator of high finesse and losses per round-trip of $V_R \ll 1$ a rule of thumb for the required modulation frequency is $$f_m = 0.4 \cdot V^2 R / f_R,$$

wherein $f_R = n L_R / c_o$ is the round-trip time of the light in the resonator with the single round-trip length $L_R$ and the index of refraction of n. For losses of, for example, $V_R = 3\% - 5\%$ and a fibre round-trip length of $L_R = 80$ cm modulation frequencies in the order of magnitude of $$f_m = 100 \text{ kilocycles per second}$$

are required.

Figure 4:
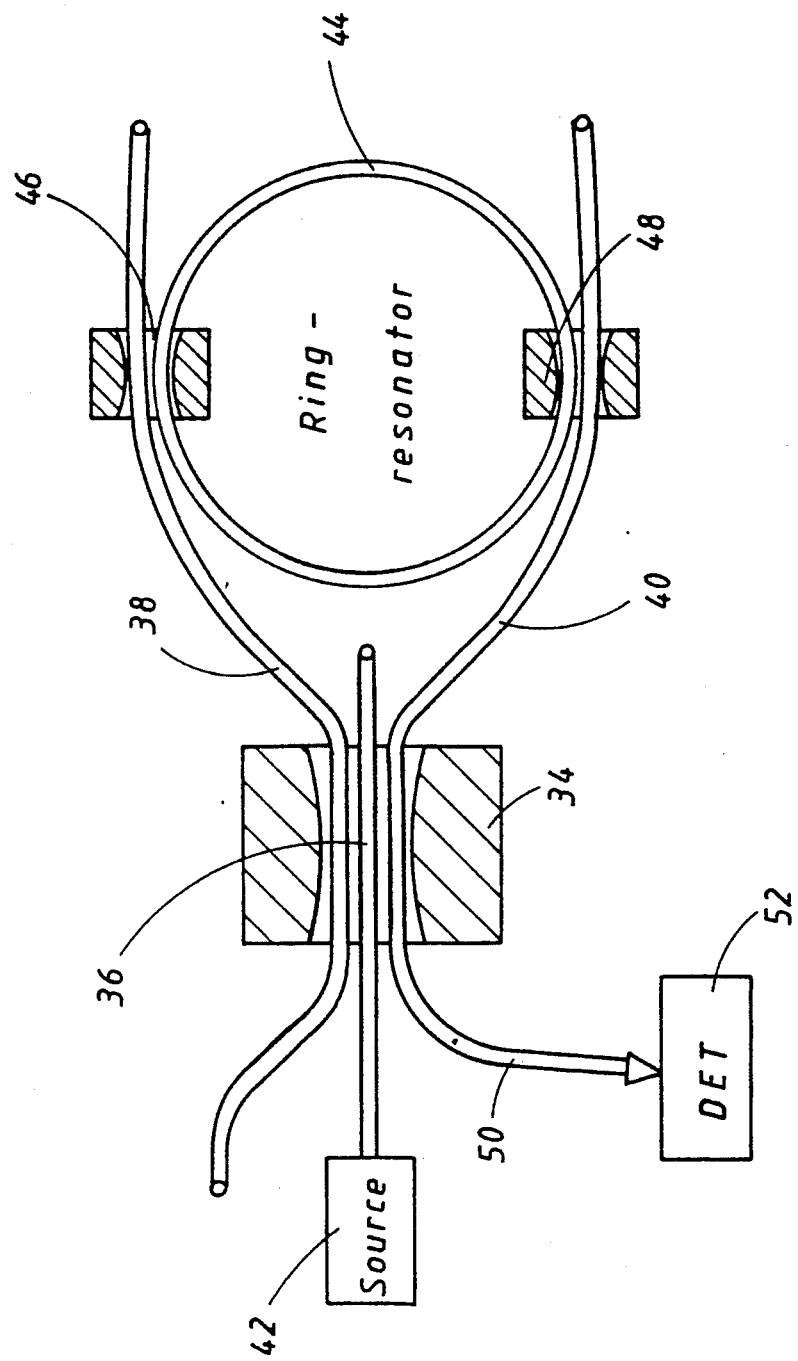
FIG. 4 shows a further modified embodiment of the inventive sensor as shown in FIG. 1, wherein the working point is shifted to a point of larger slope of the diagram of FIG. 2.

FIG. 4 shows an embodiment wherein the phase shift of 120° of a six-port coupler 34 is used to place the working point at about one third of the maximum height of the characteristic. The six-port coupler 34 couples a light conductor 36 with two light conductors 38 and 40. The light conductor 36 extends to a light source 42. An advancing light beam is coupled in the six-port coupler 34 out of the light conductor 36 into the light conductor 38. This light beam travels to the ring resonator 44 and is coupled clockwise into the ring resonator 44 by a coupler 46. Furthermore, an advancing light beam is coupled in the six-port coupler 34 out of the light conductor 36 into the light conductor 40. This light beam travels to the ring resonator 18 and is coupled counter-clockwise, as viewed in FIG. 1) into the ring resonator 18 by a coupler 48.

Of the returning light beams again the light beam returning in light conductor 40 is superimposed in the end 50 of light conductor 40 to the light beam which has been coupled by six-port coupler 34 into the end 50 from the light conductor 46. The interfering light beams impinge upon a detector 52.

The light source 10 or 42 may be a laser. In this case, the frequency of the laser has to be tuned to the resonance frequency of the ring resonator 18 or 44, respectively, by well-known means. In the described arrangement, however, the light source 10 or 42 may also be a broadband, incoherent source, the resonance line of the ring resonator 18 or 44, respectively lying within the band of this source. For example, the light source may be a super luminescence diode or an edge light emitting diode (ELED).

The light conductor and the ring resonator may be light conducting fibers such as glasss fibers. It is, however also possible that the light conductors and the ring resonator are waveguides provided in a substrate such as 54 in FIG. 1 by integrated optics technique.

While there are shown and described present preferred embodiments of the invention, it is to be distinctly understood that the invention is not limited thereto, but may be otherwise variously embodied and practiced within the scope of the following claims. Accordingly,

What is claimed is:

1. A sensor making use of a non-reciprocal optical effect and comprising:
   a passive ring resonator defining a closed light path;
   light source means;
   coupler means for coupling light from said light source means into said passive ring resonator in a first direction of propagation and in a second direction of propagation opposite to said first direction of propagation and for coupling light out of said passive ring resonator;
   detector means exposed to light coupled out of said passive ring resonator by said coupler means;
   interferometer means for superimposing light which has circulated in said passive ring resonator in said first direction of propagation, and light which has circulated in said passive ring resonator in said second direction of propagation, and producing interfering light; and
   said detector arrangement including a detector exposed to said interfering light;
   wherein said light source means comprises a broadband, incoherent light source emitting a band of light, and
   said passive ring resonator has a resonance frequency lying within said band emitted by said broadband incoherent light source.

2. A sensor as claimed in claim 1, wherein said broadband incoherent light source is a super luminescence diode.

3. A sensor as claimed in claim 1, wherein said broadband incoherent light source is an edge light emitting diode (ELED).

4. A sensor as claimed in claim 1, wherein said interferometer comprises a six-port coupler.

5. A sensor as claimed in claim 1, further including:
a first light conductor guiding a first light beam from said light source means and extending substantially tangential to said passive ring resonator;
said passive ring resonator constituting a closed light conductor;
said coupler means comprising a first coupler arranged to optically couple said first light conductor with said passive ring resonator, whereby light of said first light beam is coupled into said passive ring resonator in order to circulate therein in said first direction of propagation;
a second light conductor guiding a second light beam coherent with said first light beam from said light source means and extending substantially tangential to said passive ring resonator on a side which is remote from said first light conductor;
said coupler means also comprising a second coupler arranged to optically couple said second light conductor with said passive ring resonator, whereby light of said second light beam is coupled into said passive ring resonator in order to circulate therein in said second direction of propagation;
said first coupler being arranged to couple light from said second light beam, which has been coupled into said passive ring resonator by said second coupler, out of said passive ring resonator and into said first light conductor as a first coupled-out light beam having a direction of propagation opposite to that of said second light beam;
said second coupler being arranged to couple light from said first light beam, which has been coupled into said passive ring resonator by said first coupler, out of said passive ring resonator and into said second light conductor as a second coupled-out light beam having a direction of propagation opposite to that of said first light beam; and
said interferometer means said receiving said coupled-out light beams and superimposing the same in order to produce said interfering light.

6. A sensor as claimed in claim 5, further including:
a third coupler included in said interferometer means;
said third coupler coupling light from said second coupled-out light beam out of said second light conductor and into said first light conductor, whereby said second coupled-out light beam and said first light beam are superimposed in said first light conductor.

7. A sensor as claimed in claim 6, further including:
a fourth coupler included in said interferometer means;
said fourth coupler coupling out superimposed light from said superimposed light beams out of said first light conductor and directing said coupled-out, superimposed light to said detector means.

8. A sensor as claimed in claim 6, further including:
a phase modulator provided in said first light guide between said third coupler and said first coupler.

9. A sensor as claimed in claim 5, further including:
a third light conductor operatively connected to said light source means;
said six-port coupler coupling said first light conductor, said second light conductor and said third light conductor; and
said six-port coupler coupling out said first light beam from said third light conductor and into said first light conductor;
said six-port coupler coupling out said second light beam from said third light conductor and into said second light conductor;
said second light conductor having a free end extending out from said six-port coupler for directing light to said detector means.

10. A sensor as claimed in claim 8, wherein:
said passive ring resonator is made of a light conducting fiber; and
said first, second and third light conductors are made of light conducting fibers.

11. A sensor as claimed in claim 5, wherein:
said passive ring resonator constitutes an optical waveguide integrated into a substrate; and
said first, second and third light conductor constitute optical waveguides integrated into a substrate.

* * * * *